United States Patent
Yamanaka et al.

(10) Patent No.: US 6,576,325 B1
(45) Date of Patent: *Jun. 10, 2003

(54) LABEL

(75) Inventors: Masaaki Yamanaka, Ibaraki (JP); Kazumasa Hirano, Ibaraki (JP)

(73) Assignee: Oji-Yuka Synthetic Paper Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/600,886
(22) PCT Filed: Dec. 15, 1999
(86) PCT No.: PCT/JP99/07031
§ 371 (c)(1), (2), (4) Date: Sep. 5, 2000
(87) PCT Pub. No.: WO00/36040
PCT Pub. Date: Jun. 22, 2000

(30) Foreign Application Priority Data

Dec. 15, 1998 (JP) .............................. 10-356415

(51) Int. Cl.$^7$ .............................................. B32B 27/14
(52) U.S. Cl. ................... 428/195; 428/216; 428/343; 428/515; 428/523; 428/323; 156/229
(58) Field of Search ................... 428/221, 323, 428/195, 212, 213, 214, 215, 216, 500, 523, 515, 343; 156/229

(56) References Cited

U.S. PATENT DOCUMENTS 6,287,684 B1 * 9/2001 Yamanaka et al. .......... 428/343

* cited by examiner

Primary Examiner—Paul Thibodeau
Assistant Examiner—Christopher Paulraj
(74) Attorney, Agent, or Firm—Oblon, Spivak, McClelland, Maier & Neustadt, P.C.

(57) ABSTRACT

Disclosed is a label having a base layer (A) of a uniaxially stretched film containing 55 to 95 wt % of a thermoplastic resin and an inorganic or organic fine powder having an average grain size of 0.2 to 2 μm in an amount more than 5 wt % and not more than 45 wt %; a surface layer (B) of a uniaxially stretched film provided on one surface of the base layer (A), containing 35 to 85 wt % of a thermoplastic resin and 15 to 65 wt % of an inorganic fine powder having an average grain size of 0.2 to 2 μm; and an adhesive layer (C) of a uniaxially stretched film provided on the opposite surface of the base layer (A), containing 90 to 99 wt % of a thermoplastic resin having a melting point of 80 to 140° C., and 1 to 10 wt % of an inorganic or organic fine powder having an average grain size of 0.7 to 3 μm. The label is characterized in that being excellent in opacity, Clark stiffness, placement property in the in-mold forming and adhesiveness, and being less causative of blister or orange peel texture after the in-mold forming.

19 Claims, 1 Drawing Sheet

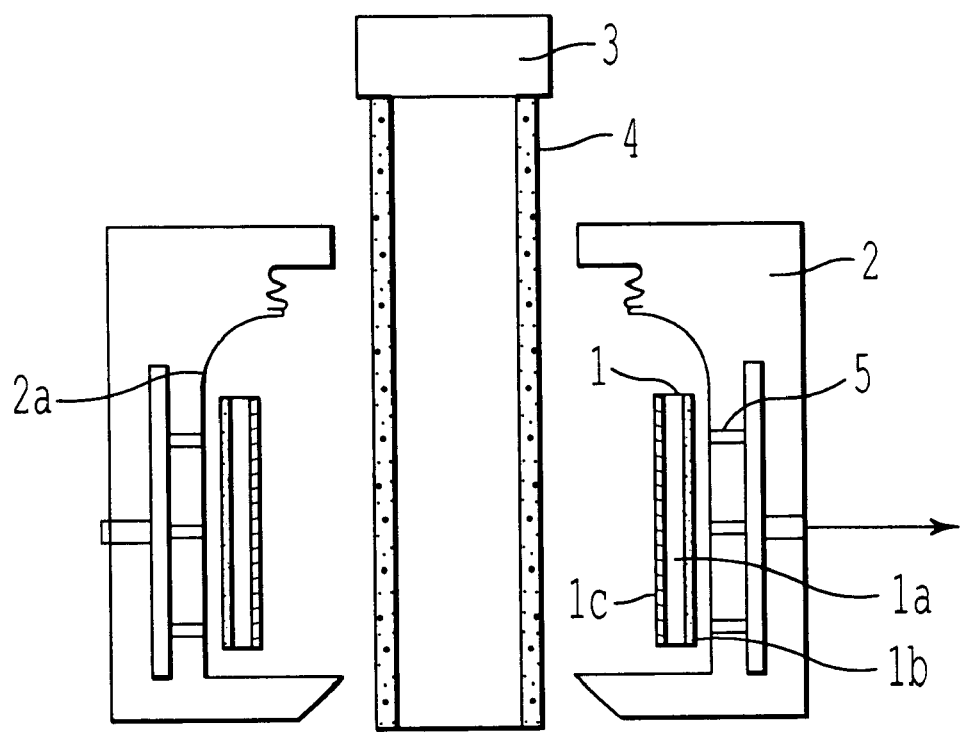

LABEL

BACKGROUND OF THE INVENTION

The present invention relates to a label suitable for in-mold forming and a method for fabricating thereof.

DESCRIPTION OF THE BACKGROUND

The in-mold forming method is known as a method for fabricating, by integral molding, a synthetic resin formed product intrinsically bearing a label. In this method, a label is first placed on the inner wall of the metal mold, and then a source resin such as polyethylene and polypropylene is directly fed into the metal mold to obtain a formed product by injection molding, hollow molding or in-mold bead foaming. Also in the process of using a polypropylene or polyethylene sheet, a label can be attached based on the same principle by a method utilizing differential pressure generated under heating of the sheet (vacuum molding, differential pressure molding).

A variety of labels have been proposed for use in such in-mold forming. An exemplary label is that obtained by coating on a base layer a solution of low-melting-point olefin resins such as ethylene-vinyl acetate copolymer using a gravure coater or the like and by successive drying; where the base layer comprises a non-stretched extruded film made of crystalline polypropylene or high-density polyethylene compounded with inorganic fine powder, or an inflation-molded film. There are also proposed films such that fabricated by stacking a low-melting-point olefinic resin film on one surface of the base layer, using an adhesive or by direct extrusion lamination.

This fabricated label, however, is disadvantageous in that the film may easily be stretched due to tensile force when it is subjected to gravure printing in a wound-up state, which may result in misalignment of patterns and prevent high-definition printing. Still another problem is that crimping of the film due to lack of its stiffness, which is likely to occur when the label cut into a predetermined size is placed on the inner wall of the metal mold using a robot inserter, so that high-speed placement of the film will be unsuccessful. Moreover, a label coated or laminated with an adhesive layer requires excessive process steps and, as a result, higher production cost.

On the other hand, as a label for overcoming the foregoing drawbacks, proposed is a label which is fabricated by laminating a low-melting-point olefinic resin such as low-density polyethylene or ethylene-vinyl acetate copolymer on a base layer comprising a sheet of longitudinally stretched crystalline polypropylene compounded with inorganic fine powder, and by transversely stretching the laminate using a tenter oven. Such label, however, contains relatively large disc-shaped voids generated in the base layer by the biaxial stretching, and the voids will be transformed in the thickness direction to exhibit so-called "orange peel texture" when in-mold formed container causes mold shrinkage together with the label attached thereon. Moreover, since the label having a biaxially stretched base layer has a high stiffness both in longitudinal and transverse directions, the container attached with such label may distort during the mold shrinkage due to a limited deformability of the label.

SUMMARY OF THE INVENTION

For addressing the above problems in the prior art, it is therefore an object of the present invention to provide a label suitable for in-mold forming. That is, the present invention provides a label excellent in smoothness of the adhesive layer, Clark stiffness and adhesiveness, and less causative of blisters or orange peel texture after in-mold forming, and of deformation of the containers. It is another object of the present invention to provide a simple and low-cost method for fabricating such a label.

BRIEF DESCRIPTION OF THE DRAWING

The drawing shows a sectional view of a forming apparatus used for producing a label-attached, hollow-formed container. Numeral 1 is a symbol for a label, 1a for a base layer, 1b for a surface layer, 1c for an adhesive layer, 2 for a metal mold, 2 for an inner wall of the metal mold, 3 for a die, 4 for a parison and 5 for a suction hole.

DETAILED DESCRIPTION OF THE PREFERRED EMBODIMENTS

The present inventors found after extensive investigations for solving the foregoing problems that a label can be attached without any problem by in-mold forming, which also yields a container with a good commercial value, by using a label comprising a base layer (A) of a uniaxially stretched film, a surface layer (B) of a uniaxially stretched film, and an adhesive layer (C) of a uniaxially stretched film, each layer having a specific composition, which led us to propose the present invention.

Thus, the present invention provides a label comprising a base layer (A) of a uniaxially stretched film containing 55 to 95 wt % of a thermoplastic resin and an inorganic or organic fine powder having an average grain size of 0.2 to 2 μm in an amount more than 5 wt % and not more than 45 wt %; a surface layer (B) of a uniaxially stretched film provided on one surface of the base layer (A), containing 35 to 85 wt % of a thermoplastic resin and 15 to 65 wt % of an inorganic or organic fine powder having an average grain size of 0.2 to 2 μm; and an adhesive layer (C) of a uniaxially stretched film provided on the opposite surface of the base layer (A), containing 90 to 99 wt % of a thermoplastic resin having a melting point of 80 to 140° C., and 1 to 10 wt % of an inorganic or organic fine powder having an average grain size of 0.7 to 3 μm.

In a preferred embodiment of the present invention, the uniaxially stretched films individually composing the base layer (A), surface layer (B) and adhesive layer (C) are stretched by 2 to 8 times. The thermoplastic resin employed herein preferably contains polyolefin resin. The label of the present invention preferably has a longitudinal Clark stiffness of 30 to 250, a transverse Clark stiffness of 10 to 50, an opacity exceeding 20%, and a smoothness of the adhesive layer (C) of 100 to 2,500 seconds. The total thickness of the label is preferably 60 to 250 μm, and a thickness of the surface layer (B) and adhesive layer (C) is 1 to 10 μm, respectively. The adhesive layer (C) is preferably embossed.

The present invention also provides a method for fabricating a film having a step for forming, on one side of a base layer (A) a surface layer (B) containing 35 to 85 wt % of a thermoplastic resin and 15 to 65 wt % of an inorganic or organic fine powder having an average grain size of 0.2 to 2 μm, where the base layer (A) being made of a uniaxially stretched film containing 55 to 95 wt % of a thermoplastic resin and an inorganic or organic fine powder having an average grain size of 0.2 to 2 μm in an amount more than 5 wt % and not more than 45 wt %; a step for forming, on the opposite surface of the base layer (A), an adhesive layer (C) of a uniaxially stretched film containing 90 to 99 wt % of a thermoplastic resin having a melting point of 80 to 140° C., and 1 to 10 wt % of an inorganic or organic fine powder having an average grain size of 0.7 to 3 μm; and a step for uniaxially stretching the obtained laminate. The uniaxial stretching is preferably effected by 2 to 8 times based on the difference in the peripheral speeds between the roll groups. Embossing of the adhesive layer (C) preferably precedes the uniaxial stretching.

The label of the present invention is characterized in that having a surface layer (B) on one surface of the base layer (A), and having an adhesive layer (C) on the opposite surface thereof. All of these base layer (A), surface layer (B) and adhesive layer (C) individually comprise a uniaxially stretched film which contains thermoplastic resin, and inorganic or organic fine powder in a specific composition.

There is no particular limitation on the species of the thermoplastic resin used for the base layer (A) and surface layer (B).

Examples of such thermoplastic resin include polyolefin resins; polyamide resins such as 6-nylon, 6,6-nylon and 12-nylon; thermoplastic polyester resins such as polyethylene terephthalate and its copolymer, polybutylene terephthalate and its copolymer, and aliphatic polyester; polycarbonate; atactic polystyrene; and syndyotactic polystyrene. Among these, non-polar polyolefinic resins are preferably used.

Representative examples of the polyolefin resins include homopolymer of α-olefin having a carbon number of 2 to 8 such as ethylene, propylene, 1-butene, 1-hexene, 1-heptene, 1-octene, 4-methyl-1-pentene and 3-methyl-1-pentene; and copolymer of 2 to 5 species selected from such α-olefins. Either random copolymer or block copolymer is allowable. More specifically, allowable are branched or normal polyethylene having a density of 0.89 to 0.97 g/cm$^3$ and a melt flow rate (190° C., 2.16 kg load) of 1 to 10 g /10 minutes; propylene homopolymer, propylene-ethylene copolymer, propylene-(1-butene) copolymer, propylene-ethylene-(1-butene) copolymer, propylene-(4-methyl-1-pentene) copolymer or propylene-(3-methyl-1-pentene) copolymer having a melt flow rate (230° C., 2.16 kg load) of 0.2 to 15 g /10 minutes. Among these, propylene homopolymer, propylene-ethylene copolymer and high-density polyethylene are preferable in terms of inexpensiveness and good forming property.

Note in this specification that a certain range of values expressed using a word "to" always includes both end values given before and after thereof.

While there is no specific limitation on the species of the thermoplastic resin used for the adhesive layer (C), it is preferable to use those having a melting point of 80 to 140° C. For example, available are polyolefin resins such as propylene-ethylene copolymer, high-density polyethylene, middle-density polyethylene, low-density polyethylene, ethylene-vinyl acetate copolymer, ethylene-acrylic ester copolymer, ethylene-methacrylic ester copolymer, ethylene-α-olefin copolymer and metal salts thereof. Among these, preferable are ethylene-base resins such as ethylene-acrylic ester copolymer, ethylene-vinyl acetate copolymer and ethylene-α-olefin copolymer.

For the base layer (A), surface layer (B) or adhesive layer (C), a single species of the thermoplastic resin selected from those listed above may be used, or two or more thereof selected from the above may be used in combination. In particular for the case that two or more thereof are used in combination for the adhesive layer (C), it is preferable to use them so that an average melting point, estimated based on the melting points of individual component resins and the blend weight ratio, will fall within a range from 80 to 140° C. Either the same thermoplastic resins or different resins can be used for the base layer (A), surface layer (B) and adhesive layer (C). Species of the thermoplastic resins can properly be selected depending on specific properties required for the individual layers.

There is no particular limitation on species of the inorganic or organic fine powder used for the base layer (A), surface layer (B) and adhesive layer (C).

Examples of the inorganic fine powder include heavy calcium carbonate, precipitated calcium carbonate, fired clay, talc, barium sulfate, diatom earth, magnesium oxide, zinc oxide, titanium oxide and silicon oxide. Among these, heavy calcium carbonate, fired clay and talc are preferable in terms of inexpensiveness and forming property.

Examples of the organic fine powder include those made of polyethylene terephthalate, polybutylene terephthalate, polyamide, polycarbonate, polyethylene naphthalate, polystyrene, melamine resin, polyethylene sulfite, polyimide, polyethyl ether ketone and polyphenylene sulfite. Among these preferably used are such that having a melting point higher than that of the thermoplastic resin employed, and is non-compatibile therewith.

For the base layer (A), surface layer (B) or adhesive layer (C), a single species of the fine powder selected from those listed above may be used, or two or more thereof selected from the above may be used in combination. For the case that two or more thereof are used in combination, it is permissible to mix the inorganic and organic fine powders.

Either the same fine powder or different fine powders can be used for the base layer (A), surface layer (B) and adhesive layer (C), provided that the average grain size must be within a range from 0.2 to 2 ìm for the base layer (A) and surface layer (B), and from 0.7 to 3 ìm for the adhesive layer (C). Selecting an average grain size of the fine powder for the base layer (A) and surface layer (B) within the above range will ensure the opacity of the obtained label exceeding 20%.

Providing micro-cracks or emboss on the surface will improve adhesiveness of printing ink and slipping property of the label, thereby to allow high-definition printing.

Selecting an average grain size of the fine powder for the adhesive layer (C) within the above range will successfully provide an irregularity on the surface thereof, thereby to prevent an air reservoir (blister) from being generated between the formed product and the label during in-mold forming.

As for the surface layer (B), it is preferable to limit a content of coarse grains having a diameter of 44 μm or above to 10 ppm or below, since such grains can form rough projections causative of white spots in printing.

When fabricating the label of the present invention, the thermoplastic resin and the inorganic or organic fine powder are mixed to form individual layers. The label of the present invention can be fabricated by any combination of various methods known to those skilled in the art.

Any label fabricated by any method will be included within a scope of the present invention as far as it satisfies the conditions as defined in claim 1.

Amounts of the thermoplastic resin and inorganic or organic fine powder used for individual layers are limited within specific ranges. For the base layer (A), the thermoplastic resin is compounded in an amount of 55 to 95 wt %, and inorganic or organic fine powder in an amount more than 5 wt % and not more than 45 wt %. The fine powder not more than 5 wt % will significantly reduce the opacity of the obtained label, and exceeding 45 wt % will cause film rupture during the stretching and will ruin the production stability.

For the surface layer (B), the thermoplastic resin is compounded in an amount of 35 to 85 wt %, and inorganic or organic fine powder in an amount of 15 to 65 wt %. The inorganic or organic fine powder less than 15 wt % will ruin the adhesive property of the ink and slipping property of the label, whereas exceeding 65 wt % will cause film rupture during the stretching and reduce the surface strength while the adhesive property of the ink and slipping property of the label may improve.

For the adhesive layer (C), the thermoplastic resin is compounded in an amount of 90 to 99 wt %, and inorganic or organic fine powder in an amount of 1 to 10 wt %. The fine powder less than 1 wt % will excessively smoothen the surface thereby to reduce blister suppressing effect during in-mold forming, whereas exceeding 10 wt % will lower the adhesive strength of the in-mold formed label due to relative reduction in the resin content.

It is acceptable to optionally add a dispersion aid, antioxidant, solubilizing agent, ultraviolet stabilizer or anti-blocking agent when compounding and kneading the thermoplastic resin with inorganic or organic fine powder. In particular for the adhesive layer (C), it is beneficial to add a known anti-blocking agent to improve the slipping property and preventing the blocking.

Composition for forming the individual layers obtained by the compounding and kneading can be formed into a layer by, for example, extrusion process, where the base layer (A), surface layer (B) and adhesive layer (C) may be stacked en bloc by co-extrusion process, or may be laminated after separately extruded. For the case of the separate extrusion, allowable is either process such that laminating the surface layer (B) on the base layer (A) and then laminating the adhesive layer (C), or such that laminating the adhesive layer (C) on the base layer (A) and then laminating the surface layer (B). It is still allowable to simultaneously laminate the base layer (A), surface layer (B) and adhesive layer (C). Moreover, allowable is either process such that the base layer (A) and surface layer (B) are co-extruded and then the adhesive layer (C) is laminated, or such that the base layer (A) and adhesive layer (C) are co-extruded and then the surface layer (B) is laminated.

Uniaxial stretching is essential for fabricating the label of the present invention. The uniaxial stretching can be performed either before or after the lamination of the individual layers. It is thus allowable to laminate precedently stretched layers, or to stretch the laminate en bloc after the individual layers are laminated. Alternatively, it is also allowable to laminate precedently stretched layers and to further stretch the laminate.

A preferable fabrication method includes the steps of laminating the base layer (A), surface layer (B) and adhesive layer (C) and then stretching the laminate en bloc, which is simpler and cheaper as compared with the case of the separate stretching and successive lamination.

A variety of known methods are applicable to the stretching. For the case using a non-crystalline thermoplastic resin, the stretching temperature can be set at a temperature equal to or higher than a glass transition point thereof; and, for the case using a crystalline thermoplastic resin, can be set within a temperature range from a glass transition point of the amorphous domain to the melting point of the crystalline domain, both ends inclusive.

While there is no particular limitation on a method for the stretching, preferable is inter-roll stretching based on difference in the peripheral speeds between the roll groups. This method allows arbitrary selection of stretching times, thereby to maximize the generation of the voids during the stretching to obtain an opaque film. Since stretching orientation of the resin occurs along the film conveying direction, so that obtained is a label having a higher tensile strength and less dimensional changes due to tension during printing as compared with those of a non-stretched film.

The stretching times can be set within a range from 2 to 8. The stretching times less than 2 will lower the tensile strength along the film conveying direction, and thus cause large dimensional changes during printing and insufficient label stiffness. On the other hand, the stretching times exceeding 8 will result in a frequent rupture of the label during the stretching.

After the stretching, it is also allowable to optionally perform annealing using heating rolls to effect thermosetting.

The total thickness of the label of the present invention is preferably 60 to 250 $\mu$m, where the total thickness of the label less than 60 $\mu$m will increase the dimensional changes during printing and likely to cause color misalignment during multi-color printing. Such label may degrade its adhesive property during high-speed in-mold forming so that in some cases the speed of in-mold forming must inevitably be slowed down.

The total label thickness exceeding 250 $\mu$m will increase morphological changes in the in-mold formed products and tends to make it difficult to obtain containers of a desired capacity.

Thickness of the surface layer (B) and adhesive layer (C) is preferably 1 to 10 $\mu$m, respectively. A thickness of the surface layer (B) less than 1 $\mu$m tends to degrade printing suitability of the surface layer (B), and a thickness of the adhesive layer (C) less than 1 $\mu$m tends to degrade the adhesion strength. Thickness of the surface layer (B) and adhesive layer (C) exceeding 10 $\mu$m tends to lower the Clark stiffness.

Printing to the surface layer (B) can be provided according to common methods.

For example, pattern, bar code, character information, and scale can properly be printed by purpose of use. Methods for printing include gravure printing, offset printing, flexographic printing, and seal printing.

The label of the present invention may be subjected to embossing finish. Embossing finish may precede printing although it generally follows printing. The label of the present invention is preferably embossed before printing.

While there is no specific limitation on the method of embossing finish, it is enabled by known press or embossing machine such as a planographic press machine or roll embossing machine by which surface irregularity on an embossing plate is transferred with aid of heat or pressure. Roll embossing process refers to a method for transferring surface irregularity of a cylindrical embossing plate onto a target material by pressing under heating. Such thermo compressive transfer can be effected by heating the label to a temperature between the heat deformation temperature and fusing temperature of the resin used in the adhesive layer (C), and then pressing an embossing plate onto the surface of the stretched film made of the thermoplastic resin. Methods for heating include infrared irradiation, hot air blowing, heat conduction mediated by a heating roller and dielectric heating. The embossing using an embossing roll can be performed either before or after the stretching, and also simultaneously with the film forming.

An emboss pattern has 5 to 200 dots or lines per one inch, and more preferably 15 to 120. Depth of a recess of the emboss pattern is ⅓ or more of the thickness of the adhesive layer (C), and more preferably ½ or more, where the recess reaching and intruding the base layer (A) also being allowable.

The label of the present invention preferably has an opacity exceeding 20%. The term "opacity" used in a context of this specification means such that measured in accordance with JIS (Japanese Industrial Standard) Z-8722. The opacity of 20% or below tends to interfere reading of bar code or the like, when the container is colored and the color is visible through the label. This also tends to make it difficult to read indications on the label.

The smoothness of the adhesive layer (C) of the label according to the present invention is preferably within a range from 100 to 2,500 seconds. The term "smoothness" in a context of this specification means such that measured in accordance with JIS P-8119. The smoothness of less than 100 seconds tends to reduce a label adhesion area, which will fail in obtaining a sufficient adhesive strength durable in the practical use. Whereas the smoothness exceeding 2,500 seconds tends to produce blister due to air reserved between a parison and label adhesion plane during in-mold forming.

Clark stiffness of the label of the present invention is preferably 30 to 250 in the longitudinal direction and 10 to 50 in the transverse direction. The term "Clark stiffness" in a context of this specification means "S" value measured in accordance with JIS P-8143. If the transverse Clark stiffness is less than 10, the label tends to crimp or dislocate during robot-assisted placement thereof to a predetermined position in a metal mold, which prevents the label from being correctly placed. Whereas, if the longitudinal Clark stiffness exceeds 250, the label tends to float up from the curved wall surface of the metal mold, thereby to cause omission of the label from the metal mold, or significant decrease in the adhesive force between a formed product and the label to generate blister.

It is recommendable to make the longitudinal direction of the label and trailing direction of the parison coincide with each other. Label placement property, label adhesive property and anti-blister property will be improved by aligning the parison trailing direction to the direction of higher stiffness of the label, while aligning a direction normal to the parison trailing direction to the direction of lower stiffness.

The label of the present invention is in particular suitable for in-mold forming. In-mold forming using the label of the present invention can be performed according to the common practice.

For example, it is possible to previously place a label of the present invention on the inner wall of the metal mold, directly feed a source resin into such metal mold, and perform injection molding, hollow molding or in-mold bead foaming. The label is now placed so that the surface layer (B) of which comes into contact with the inner wall of the metal mold.

The label can be placed by vacuum suction through the holes opened in the inner wall of the metal mold.

There is no specific limitation on the source resin fed into the metal mold, and can properly be selected depending on target applications, conditions of use and structures of the formed products. Examples of such resin include high-density polyethylene, low-density polyethylene, polypropylene, 6-nylon, 6,6-nylon, polyethylene terephthalate, polycarbonate, polyphenylene oxide, polyphenylene ether and ethylene-vinyl acetate copolymer.

For the case of adopting the hollow forming process, a heated parison of a source resin is trailed, one end of which is fused by fastening the metal mold, a compressed gas is introduced into the parison and allows it to expand. The parison is pressed to the inner wall of the metal mold to be formed into a shape conforming to the cavity of the metal mold and, in association with this, the adhesive layer (C) of the label is fused thereon. After cooling, the metal mold is opened to release a mold product attached with the label.

For the case of adopting the differential pressure molding, either of vacuum molding or compressed air molding is applicable. A combined use of vacuum and compressed air moldings is preferable in general, and plug assisting is also preferably employed.

The label of the present invention also allows heat sealing in accordance with known methods besides the foregoing in-mold forming, since the label uses on the rear surface thereof a low-melting-point adhesive resin. Thus the label of the present invention is versatile also as a wrapping material and header label. The label of the present invention can beneficially be used in a wide variety of applications.

In the paragraphs below, the present invention will further be detailed referring to Examples, Comparative Examples and Test Examples. Materials, amounts of uses, ratios and operations mentioned hereinafter can be altered without departing from the spirit of the present invention, and thus it should be understood that the scope of the present invention is not limited to the specific Examples shown below.

Materials used in the Example and Comparative Example are listed in Table 1.

TABLE 1

| Materials | Description |
|---|---|
| Polyolefin (a) | propylene homopolymer, m.p. 164° C. (DSC peak temperature) (product of Mitsubishi Chemical Corporation) |
| Polyolefin (b) | ethylene-propylene copolymer, m.p. 142° C. (DSC peak temperature) (product of Mitsubishi Chemical Corporation) |
| Polyolefin (c) | high-density polyethylene, m.p. 134° C. (DSC peak temperature) (product of Mitsubishi Chemical Corporation) |
| Polyolefin (d) | linear low-density polyethylene, m.p. 128° C. (DSC peak temperature) (product of Mitsubishi Chemical Corporation) |
| Polyolefin (e) | low-density polyethylene, m.p. 108° C. (DSC peak temperature) (product of Mitsubishi Chemical Corporation) |
| Polyolefin (f) | ethylene-(1-hexene) copolymer, m.p. 100° C. (DSC peak temperature) (product of Nihon Polychem Co., Ltd.) |
| Inorganic fine powder (a) | wet-ground heavy calcium carbonate, average grain size = 0.4 μm (product of Phimatech Co., Ltd.) |
| Inorganic fine powder (b) | wet-ground heavy calcium carbonate, average grain size = 0.8 μm (product of Phimatech Co., Ltd.) |
| Inorganic fine powder (c) | dry-ground heavy calcium carbonate, average grain size = 1.8 μm (product of Shiroishi Calcium Co., Ltd.) |
| Inorganic fine powder (d) | dry-ground heavy calcium carbonate, average grain size = 2.8 μm (product of Shiroishi Calcium Co., Ltd.) |
| Inorganic fine powder (e) | wet-ground heavy calcium carbonate, average grain size = 3.3 μm (product of Shiroishi Calcium Co., Ltd.) |
| Inorganic fine powder (f) | synthetic calcium carbonate (colloidal calcium carbonate), average grain size = 0.15 μm (product of Shiroishi Kogyo K.K.) |

EXAMPLE AND COMPARATIVE EXAMPLE

The labels of the present invention (Examples 1 to 9) and comparative labels (Comparative Examples 1 to 4) were fabricated according to the procedures described below. Types and amount of use of the materials employed, thickness of the individual layers (B)/(A)/(C), stretching conditions and stretching property were listed in Table 2.

Polyolefin-base resin and inorganic fine powder were mixed to obtain compounds [A], [B] and [C]. The compounds [A], [B] and [C] were separately fused and kneaded using three extruders conditioned at 230° C., 230° C. and 180° C., respectively, the compounds [B] and [C] were then placed within the die on the front and rear surfaces of the compound [A] layer, respectively, the obtained laminate was extruded, cooled to 70° C. using a cooling apparatus, thereby to obtain a three-layered non-stretched sheet. The sheet was heated to a predetermined temperature and then longitudinally stretched by predetermined times by the inter-roll stretching process. In Examples 8 and 9, the sheets were, in advance of the stretching, passed through the embossing rolls comprising a metal roll and a rubber roll to emboss dots of 50 µm depth spaced at 0.169 µm (150 lines/inch) on the surface of the compound [C] layer. The stretching was not performed in Comparative Example 3. In Comparative Example 4, the inter-roll longitudinal stretching was followed by transverse stretching using a tenter oven (biaxial stretching). The surface layer side of the obtained sheet was then subjected to corona treatment at 50 W/m²·minute using a discharge treatment apparatus (product of Kasuga Electric Works Ltd.) to obtain a three-layered label.

TABLE 2

| Layer | Polyolefin type | wt % | Inorg. fine powder type | wt % | Thickness of layer (µm) | Stretching conditions temp (° C.) | stretching times | Stretching property |
|---|---|---|---|---|---|---|---|---|
| Example 1 | | | | | | | | |
| (B) | (a) | 80 | (c) | 20 | 2 | 120 | 6 | good |
| (A) | (a) | 92 | (c) | 8 | 86 | | | |
| (C) | (e) | 98 | (d) | 2 | 2 | | | |
| Example 2 | | | | | | | | |
| (B) | (a) | 40 | (a) | 60 | 8 | 120 | 6 | good |
| (A) | (a) | 60 | (a) | 40 | 74 | | | |
| (C) | (e) | 92 | (b) | 8 | 8 | | | |
| Example 3 | | | | | | | | |
| (B) | (a) | 60 | (b) | 40 | 4 | 140 | 3 | good |
| (A) | (a) | 80 | (b) | 20 | 132 | | | |
| (C) | (f) | 95 | (c) | 5 | 4 | | | |
| Example 4 | | | | | | | | |
| (B) | (a) | 60 | (b) | 40 | 5 | 130 | 7 | good |
| (A) | (a) | 80 | (b) | 20 | 80 | | | |
| (C) | (d) | 95 | (c) | 5 | 5 | | | |
| Example 5 | | | | | | | | |
| (B) | (b) | 60 | (b) | 40 | 5 | 120 | 4 | good |
| (A) | (b) | 80 | (b) | 20 | 120 | | | |
| (C) | (f) | 95 | (d) | 5 | 5 | | | |
| Example 6 | | | | | | | | |
| (B) | (c) | 60 | (b) | 40 | 5 | 125 | 4 | good |
| (A) | (b) | 80 | (c) | 20 | 200 | | | |
| (C) | (f) | 95 | (d) | 5 | 5 | | | |
| Example 7 | | | | | | | | |
| (B) | (d) | 60 | (c) | 40 | 5 | 115 | 4 | good |
| (A) | (c) | 80 | (c) | 20 | 150 | | | |
| (C) | (f) | 95 | (d) | 5 | 5 | | | |
| Example 8 | | | | | | | | |
| (B) | (a) | 80 | (c) | 20 | 2 | 120 | 6 | good |
| (A) | (a) | 92 | (c) | 8 | 86 | | | |
| (C) | (e) | 98 | (d) | 2 | 2 | | | |
| Example 9 | | | | | | | | |
| (B) | (a) | 60 | (b) | 40 | 5 | 130 | 7 | good |
| (A) | (a) | 80 | (b) | 20 | 80 | | | |
| (C) | (d) | 95 | (c) | 5 | 5 | | | |
| Comparative Example 1 | | | | | | | | |
| (B) | (a) | 88 | (b) | 12 | 5 | 120 | 6 | good |
| (A) | (a) | 97 | (b) | 3 | 80 | | | |
| (C) | (b) | 99.5 | (c) | 0.5 | 5 | | | |

TABLE 2-continued

| Layer | Polyolefin type | wt % | Inorg. fine powder type | wt % | Thickness of layer (μm) | Stretching conditions temp (° C.) | stretching times | Stretching property |
|---|---|---|---|---|---|---|---|---|
| Comparative Example 2 | | | | | | | | |
| (B) | (a) | 33 | (f) | 67 | 1 | 120 | 6 | no good (note) |
| (A) | (a) | 53 | (f) | 47 | 88 | | | |
| (C) | (f) | 88 | (e) | 12 | 1 | | | |
| Comparative Example 3 | | | | | | | | |
| (B) | (a) | 60 | (b) | 40 | 15 | no stretching | | |
| (A) | (a) | 80 | (b) | 20 | 60 | | | |
| (C) | (f) | 92 | (c) | 8 | 15 | | | |
| Comparative Example 4 | | | | | | biaxial stretching | | |
| (B) | (a) | 60 | (b) | 40 | 5 | long.:140 trans.:150 | long.: trans.: | good |
| (A) | (a) | 80 | (b) | 20 | 80 | | | |
| (C) | (e) | 92 | (c) | 8 | 5 | | | |

(note)
A lot of agglomerative projections and occasional breakage observed.

Test Examples

The obtained labels were tested and evaluated as follows.

1) Measurement of Physical Properties of the Label

Opacity of the label was measured according to JIS Z-8722. Smoothness of the adhesive layer was measured according to JIS P-8119 and Clark stiffness according to JIS P-8143.

2) In-mold Forming (Fabrication of Hollow Container) and Evaluation

The label was cut into 70 mm long and 60 mm wide, and then, as shown in FIG. 1, placed in a metal mold 2 (25° C.) so as to contact the surface layer 1b with the inner wall 2a of the metal mold 2, and immobilized by vacuum suction through vacuum suction holes 5. Then performed was label-attachable hollow forming using a high-density polyethylene HB-330 (product of Mitsubishi Chemical Corporation) at a parison temperature of 180° C. and a shot cycle of 12 seconds, thereby to obtain a label-attached polyethylene container. Also a label-attached polypropylene container was obtained in a similar manner by label-attachable hollow forming using polypropylene EA-7 (product of Mitsubishi Chemical Corporation) at a parison temperature of 210° C. and a shot cycle of 12 seconds.

Label placement property in the forming, occurrence of blister, label adhesive strength and orange peel texture of the label-attached hollow container thus obtained were evaluated or measured by the methods described below.

2-1) Label Placement (Insertion) Property

States of the label placement resulted from each 100 shots of hollow molding were judged by the criteria as below:

○: all labels placed to a predetermined position without problem;

Δ: no falling but dislocation of the labels, undesirable for the practical use; and X: falling and dislocation of the labels observed during the placement.

2-2) Occurrence of Blister

State of the occurrence of blister in the label attached to each container was scored according to the criteria below, and evaluated by a total point for 20 containers (maximum 100 points):

5 points: no blister observed;

4 points: blister observed in less than 10% of the label area;

3 points: blister observed in 10% or more and less than 20% of the label area;

2 points: blister observed in 20% or more and less than 50% of the label area; and 1 point: blister observed in 50% or more of the label area.

2-3) Adhesive Strength of the Label

Four test pieces of 15 mm wide were cut out from the label-attached portion of the container, and peeling strength of the labels was measured using a tension tester Model RTM (product of Orientech Co., Ltd.) to obtain an average value.

2-4) Orange Peel Texture

The surface of the label attached to the container was evaluated for the occurrence of orange peel texture and judged by the criteria as below:

○: no orange peel texture observed;

Δ: no problem in the practical use with a slight degree of orange peel; and

X: undesirable for the practical use with a marked degree of orange peel texture.

Results of the individual tests were shown in Table 3.

TABLE 3

| | Opacity (%) | Smoothness of Adhesive Layer (C) (sec) | Clark stiffness Long. | Clark stiffness Trans. | Label Placement Property | Polyethylene Container Blister | Polyethylene Container Adhesive strength | Polypropylene Container Blister | Polypropylene Container Adhesive strength | Orange peel |
|---|---|---|---|---|---|---|---|---|---|---|
| Example 1 | 55 | 350 | 45 | 22 | ○ | 97 | 510 | 96 | 470 | ○ |
| Example 2 | 96 | 1200 | 40 | 18 | ○ | 100 | 780 | 99 | 570 | ○ |
| Example 3 | 97 | 800 | 125 | 40 | ○ | 100 | 630 | 100 | 500 | ○ |
| Example 4 | 94 | 1000 | 38 | 17 | ○ | 99 | 700 | 99 | 520 | ○ |
| Example 5 | 90 | 1200 | 68 | 30 | ○ | 100 | 600 | 100 | 510 | ○ |
| Example 6 | 88 | 1100 | 200 | 50 | ○ | 100 | 750 | 100 | 680 | ○ |
| Example 7 | 85 | 300 | 180 | 48 | ○ | 100 | 740 | 100 | 660 | ○ |
| Example 8 | 58 | 210 | 42 | 24 | ○ | 100 | 450 | 100 | 410 | ○ |
| Example 9 | 95 | 320 | 36 | 19 | ○ | 100 | 640 | 100 | 480 | ○ |
| Comparative Example 1 | 15 | 2200 | 35 | 16 | ○ | 55 | 150 | 50 | 140 | ○ |
| Comparative Example 2 | 19 | 60 | 30 | 14 | ○ | 70 | 70 | 65 | 50 | ○ |
| Comparative Example 3 | 35 | 90 | 18 | 16 | X (note) | 92 | 550 | 90 | 450 | ○ |
| Comparative Example 4 | 96 | 4000 | 35 | 70 | ○ | 88 | 250 | 89 | 150 | X |

(note)
The label was folded at the time of the placement. (unit of adhesive strength:g/15 mm width)

As is clear from Table 3, the labels of the present invention have opacity, smoothness of the adhesive layer (C) and Clark stiffness within preferable ranges and gave desirable results in all of label placement property at the time of the hollow forming, blister and orange peel suppressive property when attached onto the formed container, and label adhesive strength.

On the contrary, the label less in the amount of the fine powder (Comparative Example 1) has only an insufficient level of opacity, which prohibited recognition of a bar code or the like and the placement of the label within the metal mold due to blocking of the label.

Using a fine powder having an average grain size as small as 0.15 μm for the base layer (A) and the surface layer (B), and using a fine powder having an average grain size as large as 3.3 μm for the adhesive layer (C) (Comparative Example 2) showed a significant occurrence of blister since a low smoothness of the adhesive layer (C) weakened the adhesion strength between the label and the container. Rupture or crack of the label during the stretching was also frequently observed, which was ascribable to a lot of secondary aggregates formed in the base layer (A) and surface layer (B) due to poor dispersion.

The non-stretched label (Comparative Example 3) resulted in breakage in the process of placement due to a poor stiffness, and biaxially stretched label (Comparative Example 4) generated the orange peel texture, both of which were found as unpractical.

INDUSTRIAL APPLICABILITY

The label of the present invention has an excellent white opacity and is suitable for in-mold forming. Thus the label of the present invention is available as an in-mold label in, not only hollow molding, but also in injection molding, differential pressure molding and press forming, which ensures versatility and excellent industrial applicability thereof. According to the method of the present invention, such label can readily be fabricated.

What is claimed is:
1. A label comprising
   a base layer (A) of a uniaxially stretched film containing 55 to 95 wt % of a thermoplastic resin and an inorganic or organic fine powder having an average grain size of 0.2 to 2 μm in an amount more than 5 wt % and not more than 45 wt %;
   a surface layer (B) of a uniaxially stretched film provided on one surface of the base layer (A), containing 35 to 85 wt % of a thermoplastic resin and 15 to 65 wt % of an inorganic or organic fine powder having an average grain size of 0.2 to 2 μm; and
   an adhesive layer (C) of a uniaxially stretched film provided on the opposite surface of the base layer (A), containing 90 to 99 wt % of a thermoplastic resin having a melting point of 80 to 140° C., and 1 to 10 wt % of an inorganic or organic fine powder having an average grain size of 0.7 to 3 μm, wherein the uniaxially stretched films individually composing the base layer (A), surface layer (B) and adhesive layer (C) are stretched by 2 to 8 times.

2. The label as claimed in claim 1, wherein at least one of the thermoplastic resins contains polyolefin resin.

3. The label as claimed in claim 1, wherein the thermoplastic resin contained in the adhesive layer (C) is an ethylene-base resin.

4. The label as claimed in claim 3, wherein the thermoplastic resin contained in the adhesive layer (C) is selected from the group consisting of ethylene-acrylic acid copolymer, ethylene-vinyl acetate copolymer and ethylene-α-olefin copolymer.

5. The label as claimed in claim 1, wherein the inorganic fine powder is present in at least one of the layers and is selected from the group consisting of heavy calcium carbonate, fired clay and talc.

6. The label claimed in claim 1, wherein the organic fine powder is present in at least one of the layers and has a melting point higher than that of the thermoplastic resin in the layer or layers containing the organic fine powder.

7. The label as claimed in claim 1, wherein the content of the fine powder having a grain size of 44 μm or above in the surface layer (B) is limited to 10 ppm or below.

8. The label as claimed in claim 1, wherein the label has a longitudinal Clark stiffness of 30 to 250, and transverse Clark stiffness of 10 to 50.

9. The label as claimed in claim 1, wherein the label has an opacity exceeding 20%.

10. The label as claimed in claim 1, wherein the adhesive layer (C) has a smoothness of 100 to 2,500 seconds.

11. The label as claimed in claim 1, wherein the total thickness thereof is 60 to 250 µm.

12. The label as claimed in claim 1, wherein the surface layer (B) and adhesive layer (C) respectively have a thickness of 1 to 10 µm.

13. The label as claimed in claim 1, wherein the label is applicable to in-mold forming.

14. The label as claimed in claim 1, wherein the thermoplastic resin contained in the base layer (A) and surface layer (B) is selected from the group consisting of propylene homopolymer, propylene-ethylene copolymer and high-density polyethylene.

15. The label as claimed in claim 1, wherein the surface layer (B) has a print.

16. The label as claimed in claim 1, wherein the adhesive layer (C) has an embossing finish.

17. A method for fabricating a label comprising:

a step for forming, on one side of a base layer (A) a surface layer (B) containing 35 to 85 wt % of a thermoplastic resin and 15 to 65 wt % of an inorganic or organic fine powder having an average grain size of 0.2 to 2 µm, the base layer (A) being made of a uniaxially stretched film containing 55 to 95 wt % of a thermoplastic resin and an inorganic or organic fine powder having an average grain size of 0.2 to 2 µm in an amount more than 5 wt % and not more than 45 wt %;

a step for forming, on the opposite surface of the base layer (A), an adhesive layer (C) of a uniaxially stretched film containing 90 to 99 wt % of a thermoplastic resin having a melting point of 80 to 140° C., and 1 to 10 wt % of an inorganic or organic fine powder having an average grain size of 0.7 to 3 µm; and a step for uniaxially stretching the obtained laminate, wherein the uniaxial stretching is performed by 2 to 8 times.

18. The method for fabricating the film as claimed in claim 17, wherein the uniaxial stretching is effected based on difference in the peripheral speeds between roll groups.

19. The method for fabricating the film as claimed in claim 17, wherein the embossing of the adhesive layer (C) precedes the uniaxial stretching.

* * * * *